(12) United States Patent
Paul et al.

(10) Patent No.: US 6,314,465 B1
(45) Date of Patent: Nov. 6, 2001

(54) METHOD AND APPARATUS FOR LOAD SHARING ON A WIDE AREA NETWORK

(75) Inventors: Sanjoy Paul, Marlboro; Sampath Rangarajan, Bridgewater, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/266,339

(22) Filed: Mar. 11, 1999

(51) Int. Cl.⁷ .................................................. G06F 13/00

(52) U.S. Cl. ........................................... 709/226; 709/217

(58) Field of Search ................................... 709/201, 202, 709/203, 218, 226, 227, 223, 229, 217, 219

(56) References Cited

U.S. PATENT DOCUMENTS

| | | | |
|---|---|---|---|
| 5,031,089 | * 7/1991 | Liu et al. | 709/226 |
| 5,329,619 | * 7/1994 | Page et al. | 709/203 |
| 5,495,426 | * 2/1996 | Waclawsky et al. | 709/226 |
| 5,572,643 | * 11/1996 | Judson | 709/218 |
| 5,644,720 | * 7/1997 | Boll et al. | 709/227 |
| 5,774,660 | * 6/1998 | Brendel et al. | 709/201 |
| 5,828,837 | * 10/1998 | Eikeland | 709/202 |
| 5,933,606 | * 8/1999 | Mayhew | 709/201 |
| 6,006,259 | * 12/1999 | Adelman et al. | 709/223 |
| 6,070,191 | * 5/2000 | Narendran et al. | 709/226 |
| 6,070,192 | * 5/2000 | Holt et al. | 709/227 |
| 6,192,408 | * 2/2001 | Vahalia et al. | 709/229 |

OTHER PUBLICATIONS

G. Goldszmidt et al., NetDispatcher: A TCP Connection Router, *IBM Research Report*, IBM Research Division, T.J. Watson Research Center, Yorktown Heights, NY, May 19, 1997, vol. RC 20853, p. 1–31.*

(List continued on next page.)

Primary Examiner—Glenton B. Burgess
Assistant Examiner—Seyed M. Safavian
(74) Attorney, Agent, or Firm—Stephen M. Gurey

(57) ABSTRACT

Client's (106-1–106-N, 107-1–107-M) on local area networks (102, 103) making requests to hot sites, which are connected on a wide area network (100) such as the Internet, are redirected through one of a possible plurality of different redirectors (101, 103) to one of a possible plurality of caching servers (S1, S2, S3), which each have responsibility for mapping one or more of the hot sites. Each request is probabilistically directed by one of the redirectors to one of the caching servers that map the requested hot site in accordance with weights that are determined for that redirector-hot site pair so as to minimize the average delay that all client requests across the network will encounter in making requests to all the cached hot sites. In order to determine the weights with which each redirector will redirect requests to the hot sites to the caching servers, statistics of access rates to each hot site are dynamically determined by each redirector in the network from the traffic flow and reported to a central management station (CMS) (115). Network delay is similarly measured by each redirector and reported to the CMS, and server delay is computed using a queuing model of each server. Using these parameters as inputs, a non-linear programming optimization problem is solved as a network flow problem in order to determine the weights for each redirector that will minimize the average delay. As the access rate statistics, as well as the network delay and server delay, dynamically change, the CMS, using the network flow algorithm, recalculates the weights and forwards them back to each redirector. In other embodiments, the redirector-logical item pair for which the redirector probabilistically directs client requests may be other than a hot site identity. For example, the logical items can be groups of clients or groups of documents, and the servers to which requests are forwarded can be web servers or caching servers.

83 Claims, 5 Drawing Sheets

OTHER PUBLICATIONS

A. Bestavros., "Speculative Data Dissemination and Service to Reduce Server Load, Network Traffic and Service Time in Distributed Information System". 1063–6382 IEEE 1996. pp. 180–187.*

Antoine Mourad., "Scalable Web Server Architectures". 0–8186–7852–6/97 IEEE 1997. pp. 12–16.*

Azar Bestavros., "WWW Traffic Reduction and Load Balancing through Server–Based Caching". 1063–6552/97 IEEE 1997 pp. 56–67.*

Shiv Kalyanaraman et al., Performance of TCP/IP over ABR Service on ATM Networks. 0–7803–3336–5/96 IEEE 1996. pp. 468–475.*

* cited by examiner

METHOD AND APPARATUS FOR LOAD SHARING ON A WIDE AREA NETWORK

TECHNICAL FIELD

This invention relates to wide area networks such as the Internet, and more particularly, to a method and apparatus for minimizing the average delay per unit of time of all client requests incurred over all connections established for accessing server devices, such as web servers and proxy cache servers, which are located across the wide area network.

BACKGROUND OF THE INVENTION

In co-pending patent application Ser. No. 08/953577 entitled "Data Distribution Techniques for Load-Balanced Fault-Tolerant Web Access", by B. Narendran, S. Rangarajan (co-inventor herein) and S. Yajnik, assigned to the assignee of the present application, and which is incorporated herein by reference, a methodology is described for balancing the load on a set of devices connected on a wide area network such as the Internet. Specifically, the methodology for load balancing described in that application provides, in a first phase, an algorithm for distributing web documents, or objects, onto different servers such that the total access rates to each server (equal to the total number of connection requests that a server handles per time unit) are balanced across all the servers. Further, in a second phase of the methodology, a network flow-based algorithm is used to re-balance the access rates to each server in response to system changes without moving objects between the different servers.

In further detail, in the first phase of the load balancing methodology, logical items, such as the web documents, or objects, are mapped to different physical devices such as web servers, cache servers, ftp servers, etc., based on the a priori access rates that are known for requests from/to these web documents. This mapping, referred to the initial distribution, takes as an input the access rates of each web document, the number of replicas of these web documents that need to be made on the physical devices, such as document servers or caches, and the capacity of each of the physical devices, and produces a mapping between the web documents and the physical devices. It also produces as an output the probabilities (or weights) that will then be used by a redirection server to redirect requests from/to replicated web documents to one of the physical devices to which they are mapped. This initial distribution mapping is performed such that the load is balanced among the physical devices, or, i.e., the sum of access rates of requests to the web documents redirected to each physical device is balanced across all the devices. Load balance is achieved across the physical devices irrespective of the web documents that they handle.

In the second phase of the methodology, once the initial distribution of the web documents is performed, any change in the system parameters that affects the load balance is handled using a network flow load balance algorithm to determine new probabilities (or weights) with which the redirection server will then thereafter redirect requests from/ to web documents to one of the physical devices to which they are mapped. Thus, instead of re-mapping web documents to different documents servers or caches to handle a perturbation in load, the load is re-balanced by changing the probability with which requests to each replicated web document is redirected to one of the plurality of physical devices to which that physical item is mapped. Examples of parameters that may change in the system include the load on each physical device and the capacity of each of the physical devices, the latter of which can instantly become zero upon the failure of a device.

The goal of load balancing, as described, is to balance across all physical devices the sum of the access rates of requests to the web documents redirected to each physical device. The latency, or delay, incurred in providing a response from a physical device to a request for a web document made by a client has not been previously considered.

SUMMARY OF THE INVENTION

In accordance with the present invention, minimization of request latency on a wide area network such as the Internet is the goal rather than pure load balancing. The load sharing methodology of the present invention minimizes delay by determining the probabilities, or weights with which web requests are redirected over the wide area network to the web servers so as to minimize the average delay of all connections across all servers per unit of time. Such redirection to the different servers is effected as a function of a logical item, the logical item being the factor that the redirector uses in determining where and with what weights the request is to be directed. In determining a solution to a non-linear programming optimization problem, the network delay associated with accessing a server and the server delay, which itself is a function of the access rate on that server, are taken into account. After an initial distribution of logical items is completed, such as for load balancing purposes in accordance with the aforedescribed prior art methodology, or another method, the following are determined: (1) the access rates, which are equal to the number of requests per unit time associated with each redirector-logical item pair; (2) the network delay, which is equal to the sum of the propagation and the transmission delays between the client and the server; and (3) the server delays incurred in processing a web request. Once these parameters are measured or mathematically computed they are used to determine the solution of a non-linear program optimization problem. This non-linear programming problem is formulated and solved as a minimum cost network flow problem to ultimately determine the probability or distributions, or weights, with which each redirector in the network will then redirect requests to the different servers which can satisfy them.

In a specific embodiment of the present invention, highly popular, a/k/a hot sites, are mapped to particular caching servers dispersed in a wide area network, with each hot site being mapped to one or more caching servers. Statistics of access rates to each hot site are dynamically determined by each redirector in the network from the traffic flow and reported to a central management station (CMS). Network delay is similarly measured by each redirector and reported to the CMS and server delay at each server is computed using a queuing model of each server. Using these parameters, the CMS solves a network flow problem to determine the weights with which each redirector will then probabilistically forward requests for a hot site to the different plural servers which are responsible for that requested site. As the access rate statistics, as well as possibly the measured network delay and server delay, dynamically change, the CMS, using the network flow algorithm, recalculates the weights and forwards the adjusted weights back to each redirector. The weights with which each redirector forwards requests for specific documents to a particular server re therefore continually modified

DETAILED DESCRIPTION

The present invention is illustrated below in conjunction with exemplary client/server connection s established over the Internet using the Transmission Control Protocol/Internet Protocol (TCP/IP) standard. It should be understood, however, that the invention is not limited to use with any particular type of network or network communication protocol. The disclosed techniques are suitable for use with a wide variety of other networks and protocols. The term "web" as used herein is intended to include the World Wide Web, other portions of the Internet, or other types of communication networks. The term "client request" refers to any communication from a client which includes a request for information from a server. A given request may include multiple packets or only a single packet, depending on the nature of the request. The term "document" as used herein is intended to include web pages, portions of web pages, computer files, or other type of data including audio, video and image data.

Figure 1:
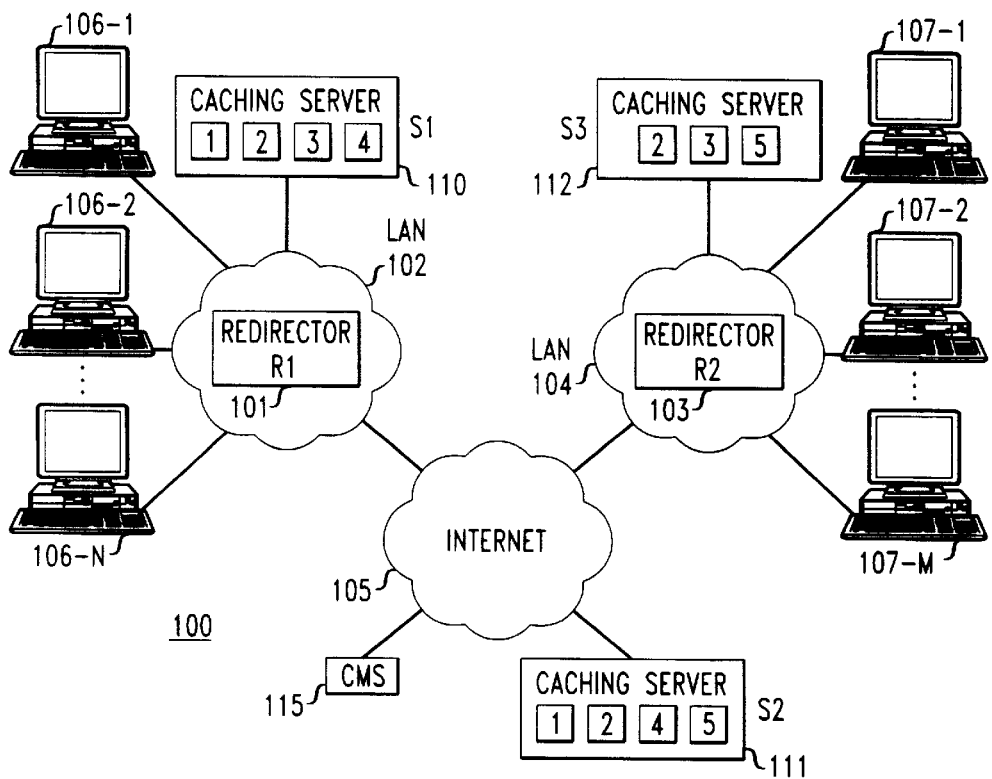
FIG. 1 is a block diagram of a system on a wide area network showing two redirectors which direct requests from groups of clients for hot sites to plural caching servers which are responsible for such hot sites in accordance with a mapped relationship.

FIG. 1 shows an exemplary web server system 100 in accordance with an illustrative embodiment of the invention. The system includes a first redirection server R1 (101) local to local area network 102 and a second redirection server R2 (103) local to local area network 104. Local area networks 102 and 104 are separated and connected over a wide area network (Internet 105). A plurality of clients, 106-1–106-N, are connected to local area network 102 and a plurality of clients, 107-1–107-M, are connected to local area network 104. All requests for web documents made by clients 106-1–106-N are passed through their local redirection server 101 and redirected to a caching server on system 100. Similarly, all requests for web documents made by clients 107-1–107-M are passed through their local redirection server 103 and redirected to a caching server on system 100. In the illustrative embodiment, a first caching server S1 (110) is connected local to local area network 102, a second caching server S2 (111) is connected to the wide area network Internet 105, and a third caching server S3 (112) is connected to local area network 104. In addition to caching individual web documents, each of these caching servers is responsible for particular hot sites, or web sites to which a large number of client requests are directed. Each caching server is responsible for one or more of such hot sites and each such hot site may be associated with more than one of the caching servers.

In the system 100, communication between clients and caching servers is effected over TCP/IP connections established over a network in a conventional manner. Each of the elements of system 100 may include a processor and a memory. The system 100 is suitable for implementing Hypertext Transfer Protocol (HTTP)-based network services on the Internet in a manner well known to one skilled in the art. For example, a client may generate an HTTP request for a particular web document on a hot site by designating a uniform resource locator (URL) of that document at the domain name of the hot site. Such a request is passed through the requesting client's local redirection server and redirected to one of the caching servers, S1, S2 or S3, which is responsible for that hot site. A TCP/IP connection is then established between the requesting client and the particular caching server responsible for that hot site as selected by the local redirection server. If the particular requested document is available at that caching server, it is supplied to the requesting client. If not, a separate TCP/IP connection is established by the caching server to the actual hot site from where a copy of the requested web document is obtained and forwarded to the client.

In the aforenoted co-pending patent application, a load distribution algorithm is presented for determining an initial distribution of a set of documents across servers and a determination of the probabilities, or weights, with which a redirector server should redirect requests to those particular servers that contain a replica of a requested document. Such load distribution is undertaken to balance the load on the set of servers where the definition of load balance is that the sum of access rates of requests to the documents redirected to each of the servers containing the documents is balanced across all the servers. Using as input the access rates of each document, the number of replicas of these documents that need to be made on the servers, and the capacity of each server, an initial distribution algorithm, described in the aforenoted co-pending application incorporated herein, produces a mapping between the documents and the servers as well as producing as output the probabilities (or weights) to be used by a redirecting server to redirect requests from/to replicated documents to one of the severs to which they are mapped to achieve the desired load balance.

Figure 2:
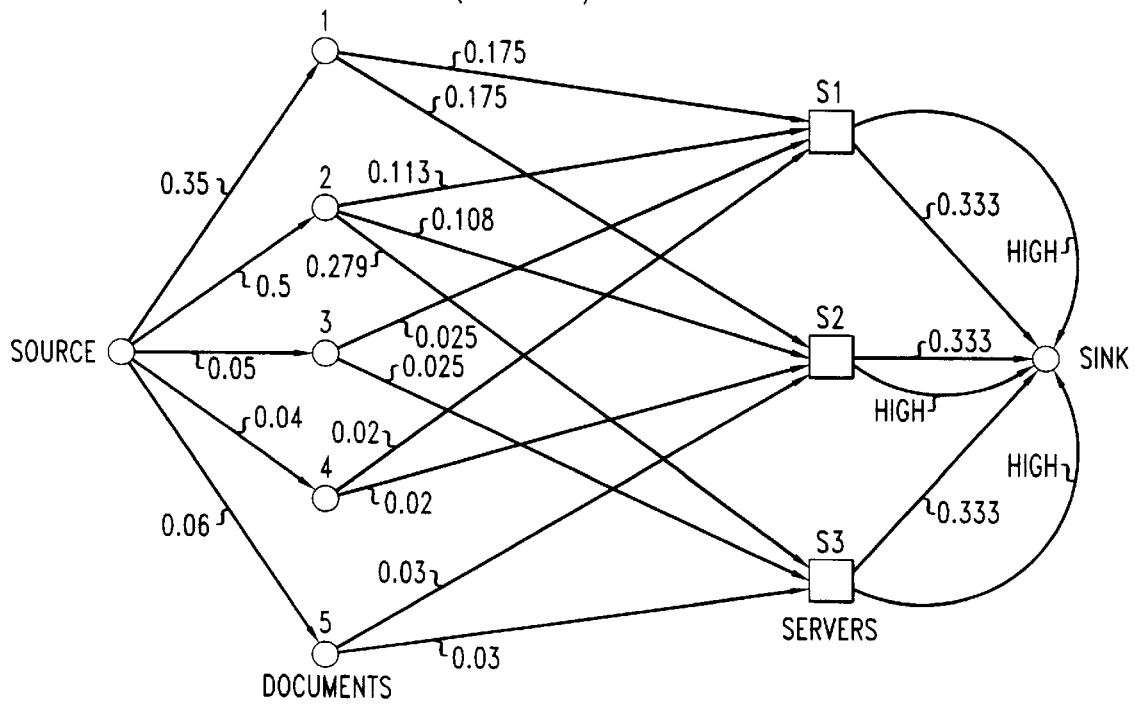
FIG. 2 is a prior art network flow solution for load balancing for a system containing a single redirector with plural caching servers.

FIG. 2 shows a flow network model in the co-pending patent application between a source and a sink for five documents, numbered 1–5 distributed on three servers, S1, S2 and S3, which each have equal scaled capacities of 0.333. The flow network is of a type described in, for example, R. K. Ahuja et al., "Network Flows: Theory, Algorithms and Applications", Prentice Hall, 1993, which is incorporated by reference herein. The scaled access rates to each of the documents, totaling 1, are shown on the five arcs between the source node and the redirector/document nodes. These access rates represent the probabilistic proportion of requests arriving at the redirector for each of the five documents. As can be noted from the arcs between the redirector/document nodes and the three server nodes, server S1 has stored replicas of document 1, 2, 3 and 4, server S2 has stored replicas of documents 1, 2, 4 and 5, and server S3 has stored replicas of documents 2, 3 and 5. These documents have been distributed in accordance with the initial distribution algorithm described in the aforenoted co-pending application to assure that at least two replicas of each document are stored in the set of three servers. The numbers on the arcs between the redirector/document nodes and the servers nodes represent the network flow solution for dividing the incoming access rate to the redirector/document nodes for each document to the servers that contain the document so that the total load to the servers S1, S2 and S3 is balanced. In the FIG. 2, the redundant arcs from the servers to the sink represent arcs that have infinite capacity but have a "high" cost associated with them. The cost on all the other arcs is equal to zero. The "high" cost arcs are used for overflows that may result when a change occurs in the system.

The distribution represented in FIG. 2 is a maximum-flow minimum-cost solution to the corresponding network flow problem that models the load balancing problem which must be solved to determine the desired solution. The solution is obtained using the mathematical language AMPL as described by R. Fourer et al., "AMPL: A Modeling Language for Mathematical Programming," The Scientific Press, 1993, which is incorporated by reference herein, in conjunction with a non-linear program solver such as MINOS. The numbers on the arcs between the redirector/document nodes and the server nodes represent the portions of the access rates for each document that are redirected to each server that contains the document. Thus, for example 0.175 of the 0.35 access rate requests for document 1 is redirected to server S1, and a similar portion is redirected to server S2. Thus, requests for document 1 received by the redirector should be redirected to servers S1 and S2 with equal weights or probabilities. Similarly, 0.113 of the 0.5 access rate for document 2 should be redirected to server S1, 0.108 of the 0.5 access rate should be redirected to server S2, and 0.279 of the 0.5 access rate should be redirected to server S3.

The corresponding weights, or probabilities, for redirection of a request for document 2 are thus 0.226, 0.216 and 0.558 for servers S1, S2 and S3, respectively.

Figure 3:
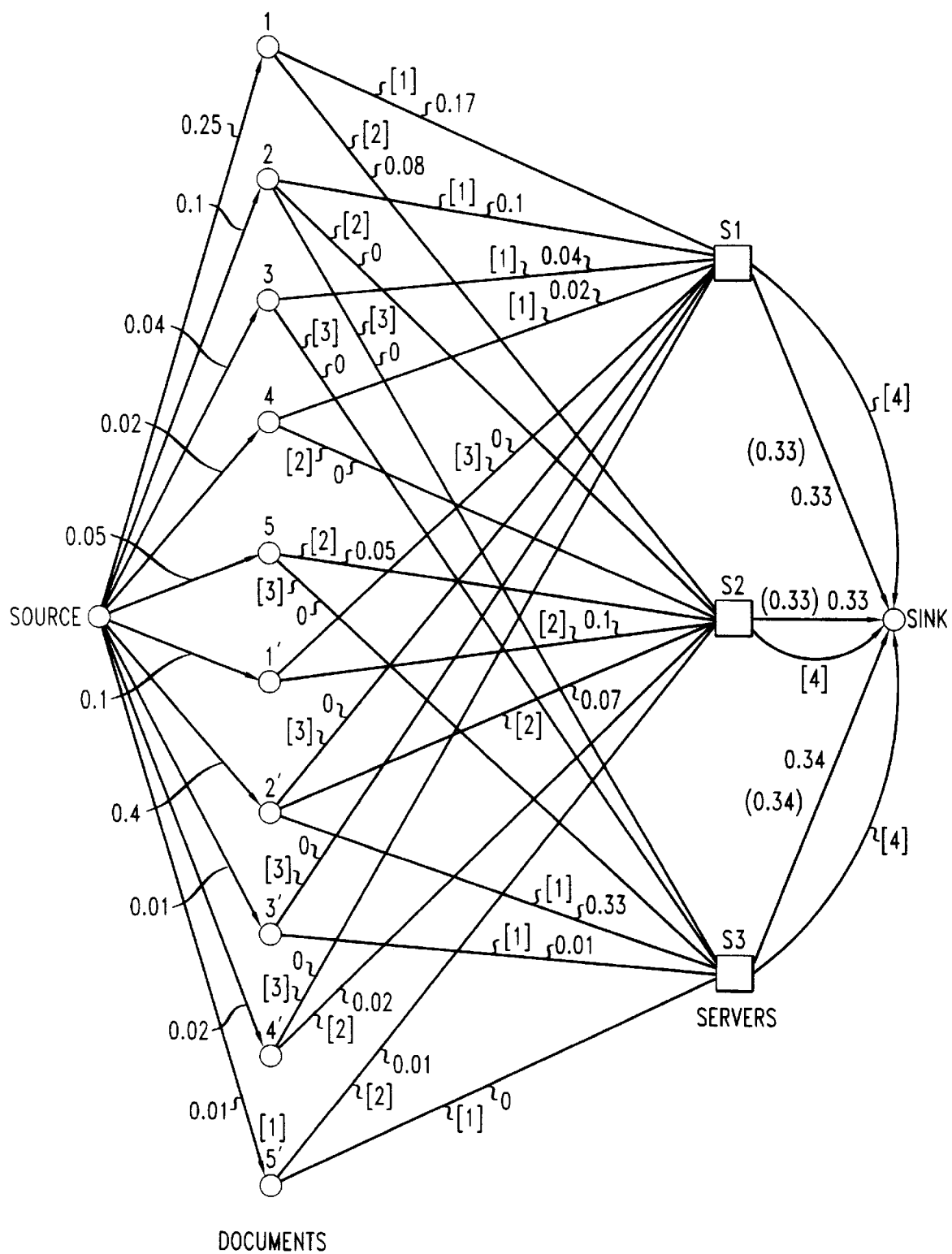
FIG. 3 is a network flow solution for load balancing for a system containing two redirectors.

Although the above example and others in the co-pending patent application illustrate load balancing initial distributions involving a single redirector server which redirects requests to a plurality of document servers on which documents are replicated, the single redirector model can be extended to accommodate multiple redirectors. FIG. 3 models the same web server system as in FIG. 2, but includes two redirectors, as in the system of FIG. 1. In FIG. 3 redirector/document nodes 1 through 5 now represent requests for documents 1 through 5, respectively, which are redirected to the servers S1, S2 and S3 by redirector 1, and redirector/document nodes 1' through 5' represent requests for documents 1 through 5, respectively, which are redirected to the servers S1, S2 and S3 by redirector 2. The scaled access rate of each document is now, however, divided between the two redirectors. As an example, the scaled access rate for document 1, which in FIG. 2 is 0.35, is divided between the two redirectors so that the access rate to document 1 redirected through redirector 1 is 0.25 and the access rate redirected through redirector 2 is 0.1. The access rates for document 2 through redirectors 1 and 2 are 0.1 and 0.4, respectively; for document 3 through redirectors 1 and 2 are 0.04 and 0.01, respectively; for document 4 through redirectors 1 and 2 they are each 0.02; and for document 5 through redirects 1 and 2 they are 0.05 and 0.01, respectively. In the single redirector model of FIG. 2, equal proximity between the redirector and the servers was assumed so that costs on the arcs between the document nodes and the server nodes were not considered as variable parameters. It can be assumed, however, as shown in the network of FIG. 1, that the distances, $d1j$, $1 \leq j \leq 3$, between redirector 1 and servers S1, S2 and S3 are such that $d11 < d12 < d13$. Thus, as in the web network in FIG. 1, S1 is local to redirector 1 on local network 102, is separated from server S2 on the Internet 105 by a mid-range distance, and is furthest from S3 which is connected on a distant local network 104. Thus, for the two-redirector arrangement in FIG. 3, redirector 1 should redirect requests for a document to server S1 if it is available there and redirect requests for a document to server S2 and then S3 only if the capacity of S1 is exceeded. To model this distance factor, costs are assigned to the arcs between the redirector/document nodes and the server nodes according to the distance between the redirector and the server. For example, requests for document 2 from redirector 1, if redirected to nearby server S1 are designated as having a cost per unit flow of 1, if redirected to mid-distance server S2 are designated as having a cost per unit flow of 2, and if redirected to distant server S3 are designated as having a cost per unit flow of 3. These same costs are assigned between the other redirector/document nodes associated with redirector 1 and the three servers. In a similar manner, redirector 2 is considered local to server S3, as shown in FIG. 1, is separated from S2 by a mid-range distance, and is separated from S1 by a long distance. In FIG. 3, the numerals in the square parentheses represent the costs on the arcs between the redirector/document nodes and the server nodes that contain replicas of the documents.

The cost on the overflow arcs from the servers to the sink needs to be carefully controlled. If load balance is the primary objective, then the costs on these arcs are chosen such that they are larger than the largest cost on the arcs that connect the redirector/document nodes to the server nodes. Otherwise, the network solution will lead to redirecting a flow to a close proximity device even if the load balance condition is violated as opposed to redirecting the flow to a device that is further away without violating the load balance requirement. For example, if the cost on the overflow arc from node S1 to the sink is chosen to be between 2 and 3, for all documents that are available in S1 and S3, redirector 1 will deterministically send the request to S1 possibly overflowing the capacity of server S1 even if server S3 has spare capacity. If the cost on the overflow arc is less than 2, requests for documents available on S1 and elsewhere will always be sent to S1 even if it overflows the capacity of Si. Where load balance is the primary objective, therefore, the costs on the overflow arcs are chosen to be 4, which is larger than the cost on any of the arcs between the redirector/document nodes and the server nodes. FIG. 3 shows the network flow solution, with flows between redirector/document nodes being specified without any parentheses around them, capacities specified within curved parentheses, and, as noted, costs specified within square parentheses. Where the capacity or the cost of an arc is not specified, its default value is 1. Using the determined flow values, the redirection probabilities, or weights, with which a request is forwarded to a particular server that has a stored copy of the requested document can be determined. Thus, for example, the flow on the arc from the redirector 1/document 1 node to S1 specifies that of the 0.25 units of scaled flow for the document 1/redirector 1 pair, 0.17 units should be redirected to server S1.

Thus, if a request for document 1 arrives at redirector 1, with a probability of 0.17/0.25, it will be directed to server S1 and with probability 0.08/0.25 it will be directed to server S2.

Unlike the solutions for load balancing focused on by the prior art, the present invention provides a solution for load sharing which considers the network delay associated with accessing a server and the server delay, which itself is a function of the access rate on that server. A network flow approach to this problem is considered after an initial distribution is completed for load balance. The aim of this load sharing solution is to minimize the average delay of all connections across all servers per unit of time. FIG. 1 is the network model of a preferred embodiment of this invention. As previously noted, hot sites rather than individual documents are mapped to servers S1, S2 and S3, which, in this embodiment, are proxy cache devices. The network delay, which is the sum of the round-trip propagation and the transmission delays, is modeled by specifying them in the network flow model as costs on the arcs from the redirector/logical item nodes to the proxy cache server nodes, where the logical items are the different cached hot sites. The links from the proxy cache server nodes to the sink have a cost associated with them which is a function of the flow through these links. This cost models the device delay. The larger the number of connections a server serves per unit of time, the larger the device delay for each of the connection requests. The capacities of these links are not now used to specify a balance of load among the server devices, but to specify a limit on the average number of connections per time unit sent to the server device above which the connections may be dropped. As is described below, the proxy cache server delay and the capacity of the proxy cache server are calculated using a queuing model.

The caching server is modeled as an M/M/1/K queue to which connection requests arrive with a Poisson arrival rate. The service time at the device is exponentially distributed. There is one server (CPU) and the maximum queue space at the server is K. This maximum queue space specifies the maximum number of simultaneous connections that the proxy cache server can support. If the number of simultaneous connection requests is greater than K, then requests will be dropped. If it is assumed that $\lambda$ and $\mu$ are the expected arrival and service rates, then it can be shown that the probability that there are k jobs in the queuing system is given by:

$$P_k = \frac{1 - \frac{\lambda}{\mu}}{1 - \left(\frac{\lambda}{\mu}\right)^{K+1}} \left(\frac{\lambda}{\mu}\right)^k \quad 0 \leq k \leq K \qquad (1)$$

Then, the average queue length at the server is given by $$\overline{N} = \sum_{k=0}^{K} k P_k.$$

Using Little's Law (see L. Kleinrock, *Queuing Systems*, Vol. 1, Prentice Hall), the average response time or the device delay at the server can be computed as $$R = \frac{\overline{N}}{\lambda}.$$

This device delay represents the sum of the queuing delay and the service delay at the server.

By letting $$\rho = \frac{\lambda}{\mu}$$

and using the above equations and after manipulations, it can be shown that a closed form solution for R is given by:

$$\frac{1}{\lambda}\left(\frac{\rho}{1-\rho}\right)\left[1 - \frac{(K+1)\rho^K(1-\rho)}{1-\rho^{K+1}}\right] \qquad (2)$$

It can be noted that when K→∞, the response time approaches $$\frac{1}{\lambda}\left(\frac{\rho}{1-\rho}\right)$$

which is the response time of a M/M/1 system with infinite queue size.

Server capacity is determined by the allowed dropping probability of connection requests. When a connection request arrives at a server, the request is dropped if there already are K connections being served by the server. The probability that an arriving request sees K existing connections at the server is given by $P_K$. If it is assumed that the dropping probability is to be less than $P_d$, then the maximum flow F (and thus the capacity) that is allowed at a server is calculated as $P_K < P_d$. From the equation for $P_K$, it is found that $$P_K = \frac{\rho^K(1-\rho)}{1-\rho^{K+1}}.$$

F is substituted for $\lambda$ in $P_K$ and this valued is bounded to be within $P_d$. Solving for F then provides the maximum flow that can be sent to a server. From the following equation, F can be computed:

$$\frac{\left(\frac{F}{\mu}\right)^K \left(1 - \frac{F}{\mu}\right)}{1 - \left(\frac{F}{\mu}\right)^{K+1}} < P_d \qquad (3)$$

The load sharing algorithm is illustrated using an example applied to the proxy caching hot site network arrangement of FIG. 1. The queuing module previously discussed is used to compute the server delay at each proxy caching server. This server delay will be a function of the amount of flow sent to that server (which represents the number of connection requests per time unit sent to that server). The maximum flow that can be sent to a server (which represents the maximum rate at which connection requests are redirected to a server) such that the specified condition on the connection dropping probability is satisfied is also computed.

Figure 4:
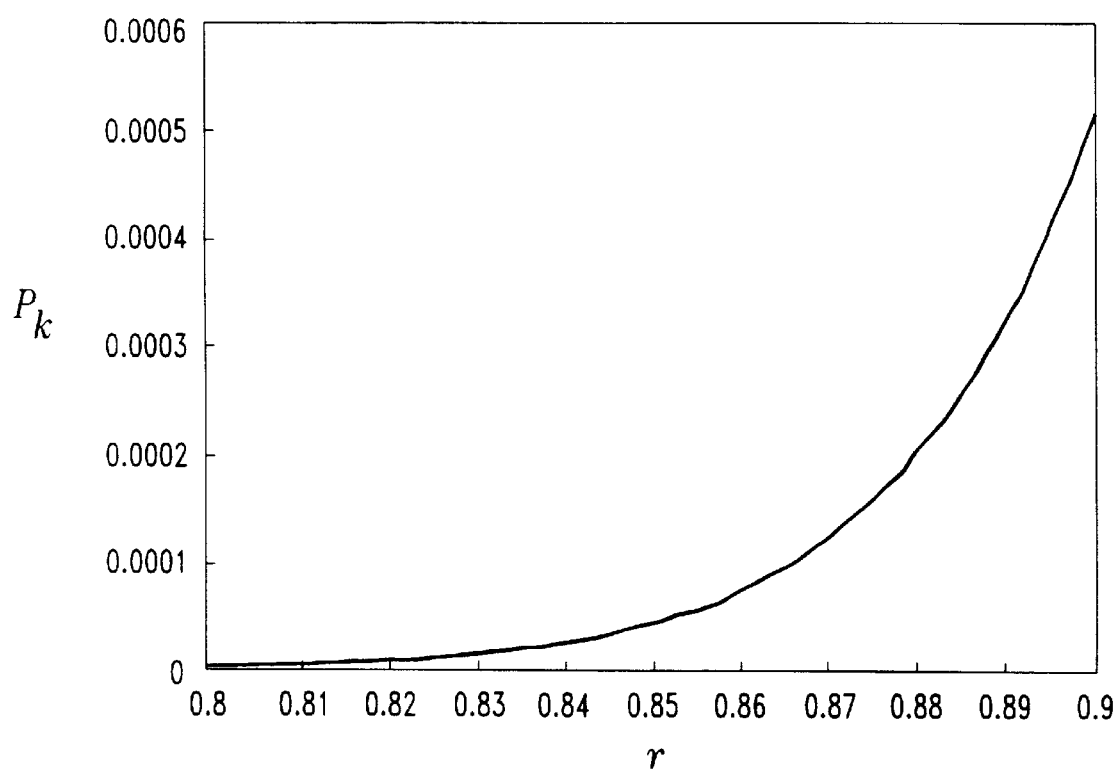
FIG. 4 is a graph showing the probability of a server dropping a connection request.

In this example, the maximum number of simultaneous connections that can be handled by a proxy caching server (K) is set to 50. This means that if the proxy caching server is handling HTTP requests, it can handle 50 such requests simultaneously. It drops extra connection requests that come in if it is already handling 50 requests. The maximum connection loss probability, $P_d$, is set to be 0.0001, which means that on an average only 1 in 10000 connections is not completed and is dropped at the server. FIG. 4 is a plot of the connection loss probability $P_K$ versus r=F/$\mu$ with K=50. From the plot it can be seen that for r≦0.865, $P_K$<0.0001. That is, for F<0.865×$\mu$, $P_K$<$P_d$. Depending on the service rate $\mu$ at a server, the maximum flow F that can be sent to that server can be computed. The service rate $\mu$ at a server specifies the rate at which HTTP connection requests are satisfied. Assuming that on an average each object is 4K bytes and that proxy servers are connected through a 10

Mbit/sec ethernet, it can be reasonably assumed that the bottleneck is the bandwidth of the network and not the CPU performance. Then, to transmit a 4K byte object over a 10 Mbit/sec network requires 3.2×10⁻³ seconds, which means that the service rate $\mu$ is $$\frac{1}{3.2 \times 10^{-3}} \approx 312.$$

Thus, the proxy cache server can handle approximately 312 HTTP connection requests per second. If it can be assumed for this example that all servers can handle approximately 312 connections per second, then F should be found by 0.865×312 ≈269 at all servers. The server delay as a function of the flow $\lambda$ sent to the cache is given by Equation (1) above. Given the above parameters, the server delay $R(\lambda)$ is given by:

$$\frac{1}{\lambda}\left(\frac{\left(\frac{\lambda}{312}\right)}{1-\left(\frac{\lambda}{312}\right)}\right)\left[1 - \frac{(51)\left(\frac{\lambda}{312}\right)^{50}\left(1-\left(\frac{\lambda}{312}\right)\right)}{1-\left(\frac{\lambda}{312}\right)^{51}}\right] \quad (4)$$

For purposes of the example, it is assumed that the network delay from redirector 101 to nearby caching server S1 on the same local network is 10 ms, to mid-distance caching server S2 on the Internet 105 is 40 ms, and to caching server S3 on the distant local network 104 is 200 ms. Similarly, the network delay from redirector 103 to nearby caching server S3 is assumed to be 10 ms, to mid-distance caching server S2, 40 ms, and to distant caching server S1, 200 ms.

Figure 5:
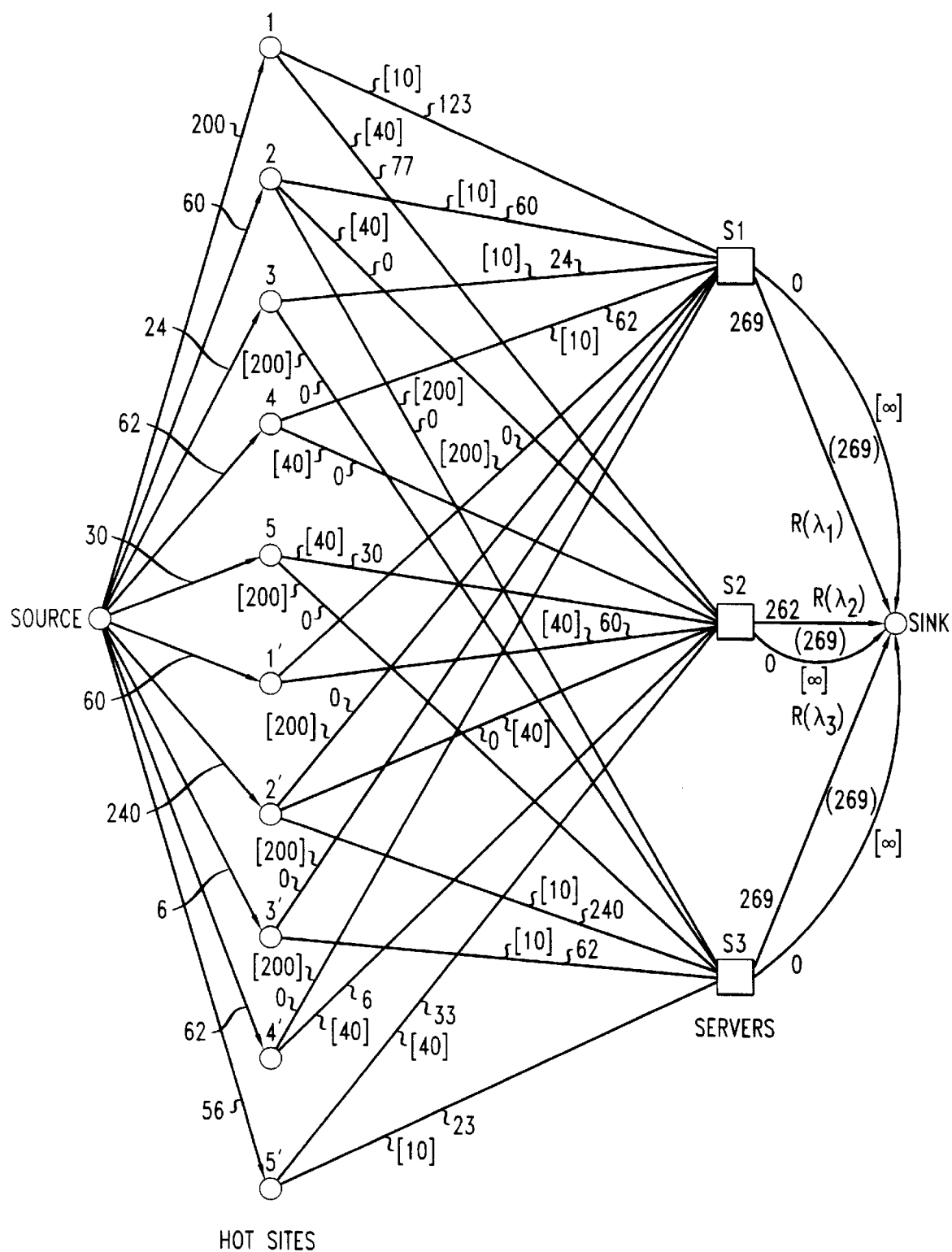
FIG. 5 is a network flow solution of a load sharing problem for the system in FIG. 1.

FIG. 5 illustrates a network flow model 500 of the server system 100 in FIG. 1 in which the parameter values noted above have been incorporated. From the initial distribution, caching server S1 is responsible for hot sites 1, 2, 3 and 5; caching server S2 is responsible for hot sites 1, 3, 4 and 5; and caching server S3 is responsible for hot sites 2, 3 and 5. This mapping is noted in FIG. 1 within the S1, S2 and S3 caching servers. This is parallel to the mapping of documents on the three servers used in conjunction with the description of FIG. 2 for load balancing. From source 501, a total of 800 connection requests per second are generated for all hot sites. The requests flowing through redirector 101 are represented by the arcs between the source 501 and the redirector/hot site nodes 1–5 and the requests flowing through redirector 103 are represented by the arcs between the source 501 and the redirector/hot site nodes 1'–5'. The numbers associated with the arcs from source 501 to the redirector/hot site nodes 1–5, and 1'–5' specify the connection requests flowing through each respective redirector to each hot site. The cost representing the network delays are shown in the square brackets on the arcs between each redirector/hot site node and the server nodes. Each caching server is assumed, as noted above, to support up to 50 connections per time unit without dropping any connections. If more requests are directed to these devices, then some connections may be dropped. All overflow connections are handled through the overflow arcs between the server nodes and the sink 502. The cost parameter chosen for these arcs (represented in FIG. 5 as infinity [∞]) should be chosen to be a larger number than the cost on all other arcs. The server delay at the proxy caches, shown as the cost on the arcs between each proxy cache server and the sink 502, is given by $R(\lambda_1)$, $R(\lambda_2)$, and $R(\lambda_3)$, where $\lambda_i$ is equal to the connection requests directed to caching server S1 and $R(\lambda_i)$ is calculated using equation (4).

The model in FIG. 5 is solved using the aforenoted AMPL mathematical programming language and the MINOS non-linear program solver with a goal of finding a solution to the non-linear problem such that the average response time for all of the 800 connections arriving per second is minimized. AMPL is a mathematical programming language that can be used to specify different optimization problems. It is used here to specify a minimum cost network flow optimization problem. For example, the load sharing network flow model of FIG. 5 can be modeled using the program shown in Appendix 1. The program defines the nodes in lines 101–103, the connectivity of the node in lines 104–106, specifies that the flow in must equal the flow out at line 107, specifies various criteria line 108–113, the function to be minimized in line 114 (postulated in the program as a minimization of total cost), and the different constraints of the problem in lines 115–118. The different parameters of this network, such as the number of hot sites, the number of redirectors and the number of proxy cache servers can be varied by specifying them in a data file with which the program is associated. Further, the input parameters of the model such as access rates, delays and capacities are also specified in this data file. The data file for the example in FIG. 5 is shown in Appendix 2. The AMPL environment takes the model file and data file and uses one of several different solvers to solve the optimization problem depending on the nature of the problem. As the specified problem is a non-linear optimization problem, the MINOS solver is used to solve the problem. The output of the solver provides the flow on each link between the redirector/hot-site nodes to the server. These flow values, noted on these arcs are then used by the redirectors to determine the probability or weights with which a request for a hot site is redirected by that redirector to a particular proxy cache server that is responsible for that requested hot site.

With reference to the mathematical example shown in FIG. 5, of the 200 requests per second that arrive for hot site 1 at redirector 1, the solution indicates that 123 requests are redirected to caching server S1 and 77 requests are redirected to caching server S2. This means that when a subsequent request for hot site 1 arrives at redirector 1, it should be redirected to server S1 with a probability of 123/200 and to S2 with a probability of 77/200. Similarly, when a subsequent request for hot site 5 arrives at redirector 2, it is redirected to server S2 with a probability of 33/56 and to server S3 with probability 23/56. The solution illustrated in FIG. 5 results in all the other requests arriving at a redirector being redirected to the closest server. All the requests that do arrive at server S2 in the example are those that cannot be served at a closer server because a) the request hot site is not cached at the closer server; or b) redirecting the request to the closer server will violate its capacity requirement. The flow, the $\lambda$ values, going into each server are shown on the arcs from the server nodes to the sink node 502. The capacity of each such node is shown on these same arcs in the curved parentheses. As can be noted, servers S1 and S3 are filled to their capacity while server S2 still has some spare capacity available.

It can be noted from FIG. 5 that the load is now not balanced but shared among the servers such that the average delay is minimized. From the solution, the total minimized delay of all the 800 connections is calculated to be 15860 ms for an average delay of 19.825 ms per connection. The number of connections redirected to each device is noted to be less than or equal to the maximum number of connections that can be handled and thus the condition on the probability of dropped connections is satisfied. Thus, as can be noted in FIG. 5, there is zero flow in the overflow arcs between the server nodes and sink 502.

In accordance with the embodiment of the present invention in FIG. 1, a connection management station (CMS) 115 performs a network flow computation to calculate the weights with which redirectors 101 and 103 will redirect further incoming requests for one of the five numbered hot sites. Once the calculation is performed, the resultant weight values are sent back to the appropriate redirector over, for example, a TCP/IP connection. CMS 115 is shown connected to the Internet 105 but in actuality can be connected anywhere on the network in FIG. 1, such as on local network 102 or on local network 104. In order for the CMS 115 to perform a network flow calculation it periodically collects access rate and network delay information from redirectors 101 and 103 and server delay information from the caching proxy servers S1, S2 and S3.

Access rate information to each hot site is determined by each redirector by associating the destination address in the SYN packets with a set of hot site IP addresses. Alternatively, this information can be collected by examining, at the redirectors, the HOST field in the GET packets.

In the network configuration of FIG. 1 in which redirector 101 is local to clients 106-1–106-N and redirector 103 is local to clients 107-1–107-M, the redirectors do not have to treat traffic from different local clients in different manners. Network delay can therefore be accounted for by just considering the delay from a each redirector to each of the different caching servers. For a symmetric flow of traffic in which packets from the clients to the caching servers and from the caching servers to the clients flow through the redirector, network delay can be tracked by each redirector by computing the time between redirecting a SYN packet to a particular caching server and receiving the corresponding SYN ACK packet back from that server. In an asymmetric flow of traffic in which the client-to-server traffic flows through the redirector but the reverse traffic flows directly from the server to the client, the SYN ACK packet will not flow through the redirector. Therefore, network delay can be measured with another mechanism such as by PINGing the servers periodically.

Server delay at each of the caching proxy servers S1, S2 and S3 is calculated using the aforedescribed queuing model which resulted in equation (4) from which the server delay $R(\lambda_i)$ is determined as a function of the flow $\lambda_i$ into server S1.

Once an initial distribution of hot sites onto caching servers is performed based on access rate information to achieve load balancing in the manner specified in the co-pending application, CMS 115 performs a network flow computation for purposes of load sharing to determine the weights with which the redirectors should redirect requests to replicated hot site caches. Using these determined weights at each redirector minimizes the average delay of all connections across all of the caching servers per unit of time. This load sharing network flow computation is continually updated by periodically collecting current access rate and network delay information from each redirector and server delay information from the cache servers. Thus, the weights are continually updated based on the latest access rate, network delay and server delay information. Further, if the CMS 115 detects a failure of a caching server, it will trigger a network flow computation. In this case, the corresponding node is removed from the network flow model as well as all arcs incident upon it. Further, the service rate, $\mu$, may change at a caching server if, for example, one of two processors fails or if a device is replaced by another device with a higher performance CPU. This will affect two parameters: a) the delay at a server given that a specific number of connections are redirected to that server; and b) the capacity of the server in terms of the maximum flow that can be redirected to that server. As a result of a service rate change, a network flow computation can be triggered. Even further, if the access rate to a particular hot site suddenly and dramatically changes, a redirector will trigger a network flow computation. In this case, the flows on the arcs from the source to the redirector/hot site nodes are changed on the network flow model. Changes in other parameters can also affect the network flow computation. Thus, if the relative round-trip delay from the redirectors to the caching servers changes, the costs associated with the arcs from the nodes representing the redirectors to the server nodes are changed. Also, since server load and server delay are determined by the number of requests redirected to a caching server, a change in such number of requests per second redirected to a server will change the server delay parameter.

Figure 6:
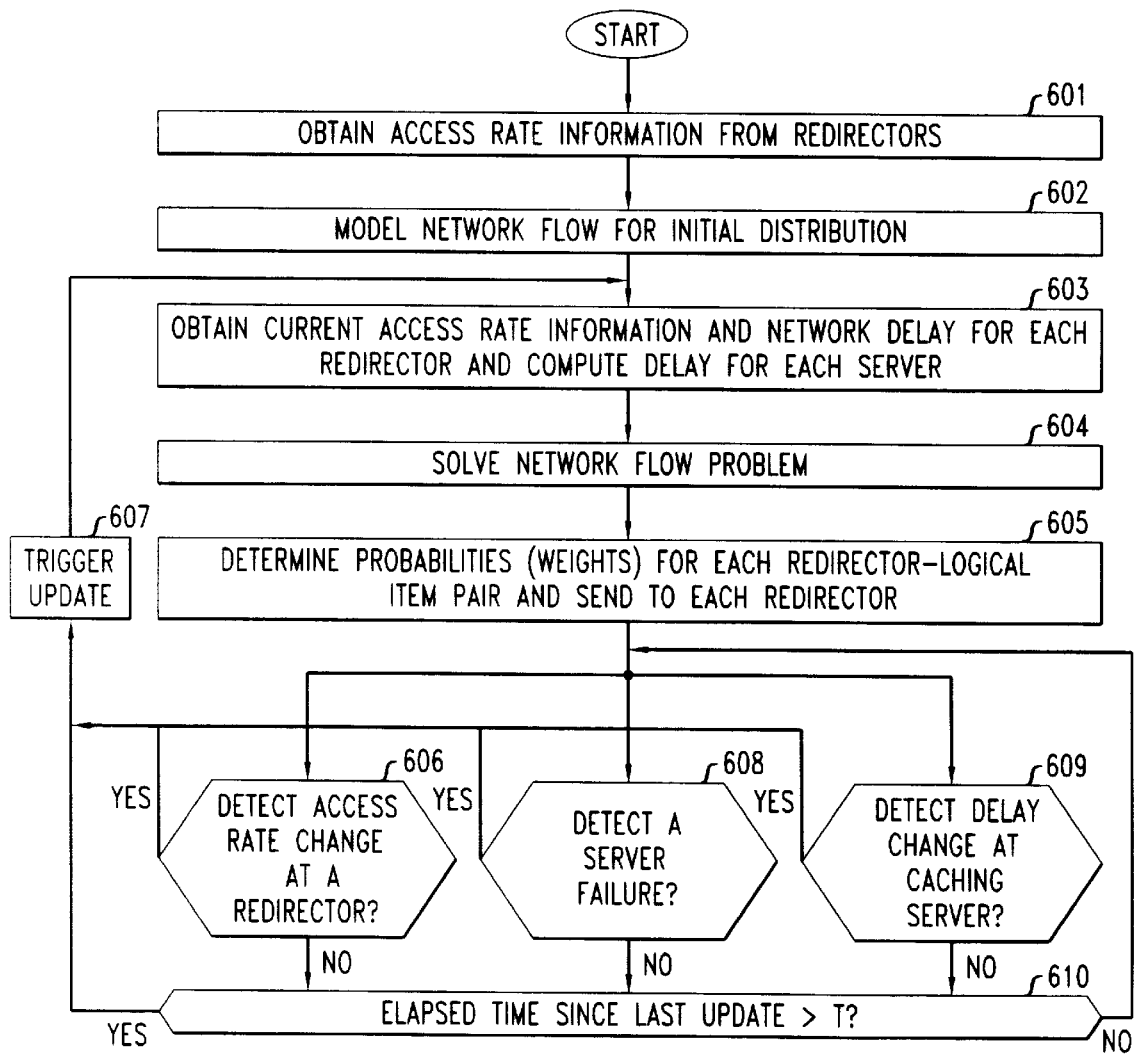
FIG. 6 is a flowchart detailing the steps of the present invention.

FIG. 6 is a flowchart detailing the steps of the method of the present invention. At step 601, access rate information is obtained by CMS 115 from each redirector. At step 602, using this access rate information, an initial distribution of hot sites on the caching servers is determined using the prior art load balancing network flow algorithm. Once the initial distribution is determined, at step 603, CMS 115 obtains current access rate and network delay information for each redirector, and the server delay of each server is calculated. Using these inputs, at step 604, a network flow problem for load sharing is solved. At step 605, the probabilities (or weights) for each redirector for each hot site pair are determined and sent to each redirector. At decision step 606, a determination is made whether there has been an access rate change at a redirector. If yes, an update is triggered at step 607, which in turn causes the current access rate, network delay, and server delay to be determined or calculated back at step 603. Similarly, at decision step 608, a determination is made whether a server failure is detected. If yes, an update is triggered again at step 607. Further, at decision step 609, a determination is made whether or not a change in the delay at a caching server is detected. If yes, an update is triggered at step 607. If an access rate change, a server failure, or a caching server delay change are not detected at either decision steps 606, 608 or 609, respectively, then, at decision step 610, a determination is made whether the elapsed time since the last update has exceeded a threshold period of time, T. If not, the flow returns to the inputs of decision steps 606, 608 and 609. If the elapsed time has exceeded T, then an update is triggered at step 607.

In the described embodiment, CMS 115 performs a centralized data gathering and network flow analysis function. Such functions could alternatively be performed at either redirector through TCP/IP communication between both such redirectors for exchanging access rate and delay information. Further, server delays need to be communicated to the redirectors.

Although described in conjunction with a system designed to achieve load balance across plural caching servers containing replicated hot sites for which in the network flow model the logical item at each redirector/logical item node represents a hot site, the present invention is not limited to such an arrangement. Thus, rather than having the logical items which are mapped to different servers being hot sites, as described above, the logical items could be any group of hot documents which are mapped onto a plurality of local caching servers in accordance with the document's origin server IP addresses. The origin server IP addresses of the documents are hashed to different groups. The different groups are then considered the logical items which are mapped onto the plural caching servers. Since many origin servers use multiple IP addresses, to avoid the same origin server name from being mapped to multiple caches, the hashing function is chosen so that the all IP addresses for an origin server are mapped to the same group out of a possible 256 different groups. Since origin servers normally use a contiguous block of IP addresses, then if the hashing is based on the first 8 bits of the origin server IP address, this contiguous block of IP address will be automatically mapped to the same group.

Alternatively, the logical items could be any group of hot documents identified by the URLs, as might be done if a content-smart switch is used as the redirector. For this case, documents may be grouped according to the type of objects requests, such as .html, .jif, .jpeg, etc.

Another way to perform the group mapping could be based on the logical names of the origin servers. Different logical names could be mapped to different groups. This requires looking at the HOST field found in the GET packets to keep track of the access rates to the different servers, and thereby to the groups. The initial distribution algorithm can then be used to decide where the logical items should be distributed. Alternatively, the initial distribution can be performed based on other information such as the proximity of the cache to the clients requesting a specific document. Once the initial distribution is performed by either these method, or by another method, the load sharing algorithm of the present invention is performed to minimize the average delay of all connections across all of the caching servers per unit of time. Thus, access rate information to each formed group, network delay and server delay are determined as inputs to the network flow problem. From the network flow solution to the non-linear optimization problem, the optimum weights for each redirector/group of documents for the desired load sharing are determined. These weights, then determine the probabilities with which the redirector directs a request for a document within one of the replicated logical items, the latter being one of the formed groups of origin server IP addresses.

In the embodiments discussed hereinabove, it has been assumed that the clients are local to one of the redirectors. Therefore, the network delay between the client and the redirector has not been considered as a factor in the solution to the load sharing problem. The other possibility is for the redirectors to be closer to a plurality of servers. In this scenario, a client's request for a logical name is resolved by a Domain Name Server into a redirector's IP address, which in turn redirects the request to a server in a cluster of essentially duplicated servers. In this case, server side load balancing is achieved, in accordance with the present invention, so as to minimize the average delay per unit of time of all requests of all connections across all the servers in the cluster. In such an embodiment, client IP addresses are mapped into groups by a simple hashing function. As an example, the first 8 bits of the client IP addresses can be used to determine which of 256 client groups a client is mapped into. Other hashing functions could be found that evenly distribute the clients among the groups such that the access rate of clients allocated to each of the groups are evenly distributed among the groups. Regardless of the hashing function, each group becomes a logical item which is mapped onto the physical devices, which are, in this case, the back-end servers. The initial distribution algorithm can be used to map these logical items to the servers. The network flow based algorithm can then be used to compute the redirector probabilities associated with each redirector/logical item pair, which in this case is a redirector/client group pair. In the network flow model then, the arcs between the source and each redirector/client group pair represent the requests generated from each group that need to be redirected to one of the back-end servers. The load sharing solution to the network flow problem, in accordance with the present invention, will produce the weights with which the redirectors direct requests from each of the client groups to the plural servers. The cost associated with each arc represents the delay. Thus, the cost on an arc between the source and one of the redirector/client group nodes represents the network delay encountered between a client group and the redirector, while the cost on an arc between a redirector/client group node and a server represents network delay between the redirector and one of the servers, plus that server's delay. In the hot site embodiment of the present invention previously described, it was assumed that the clients and the redirectors were local to one another so that the delay between each was a constant small value, and thus not a variable. With server side load sharing, this delay is certainly a variable that is considered in the network flow load sharing solution.

If the redirector is local to the back-end servers, then the network delay computation does not have to include the delay from the redirector to the servers. By grouping the clients together in groups according to their IP addresses, the clients within each group are likely to be geographically proximate. Thus, the network delay can be determined for each group of clients and a specific server by determining the network delay from each client group to the redirector. For a symmetric traffic flow, the delay from the client group to the redirector can be calculated at the redirector by keeping track of the time between redirecting a SYN ACK packet from the server to the client group and the time an ACK packet for the SYN ACK packet is received at the redirector as part of the three-way TCP handshake. With an asymmetric traffic flow model, the SYN ACK packet does not flow through the redirector. In this case, the redirector can periodically PING one or more clients in a client group to calculate the delay from that client group to the redirector. Further, the redirector separately keeps track of the access rates from each client group in order to solve the network flow for load sharing.

If the redirector, rather than being local to the back-end servers, functions as a virtual server which, upon receipt of a request, redirects the request to one of a plurality of servers located in different locations on the wide area network, then the delay between the redirector and each server also needs to be taken into account in addition to the delay between each client group and the redirector. If the traffic flow is symmetric, the redirector can calculate the network delay from a client group to a server by adding the delay from the client group to the redirector to the delay from the redirector to the server. The delay from the redirector to the server can be calculated as previously described by keeping track of the time between redirecting a SYN packet to a server and receiving the corresponding SYN ACK packet. As before, the delay from the client group to the redirector can be calculated at the redirector by keeping track of the time between redirecting the SYN ACK packet from the server to the client group and the time an ACK packet for this SYN ACK packet is received at the redirector. If the traffic flow is asymmetric, the delay on the traffic that flows directly from the server to the client is of interest. The client to server delay is not as an important parameter since most of the HTTP traffic flows from the servers to the clients. The mechanism used for the symmetric flow case can be used as an approximation for the server-to-client delay or it can be estimated by the redirector using geographical information, such as that provided by IANA as used in Classless Inter-Domain Routing Protocol.

The network flow model can thus be used to solve the load sharing problem when the logical item in the redirector/logical item pair is associated with the clients making requests to a server or the servers providing responses to requests from clients. Further, the network model is flexible to provide a solution when a delay is associated with the link between a client group and the redirector, on the link between the redirector and the server, or on both links.

The foregoing therefore merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited hereinabove are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements hereinabove reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams and flowcharts described hereinabove represent conceptual views of illustrative circuitry and processes embodying the principles of the invention. Similarly, it will be appreciated that any flowcharts, flow diagrams, state transition diagrams, pseudocode, and the like represent various processes which may be substantially represented in computer readable medium and so executed by a computer or processor, whether or not such a computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implement as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent to those shown hereinabove.

The invention claimed is:

1. A method of processing client requests through at least one redirector to a plurality of servers connected on a communications network to minimize an average delay associated with the client requests, at least some of the client requests being capable of being satisfied by more than one of the servers, the method comprising the steps of:
    a) determining an access rate of requests associated with each of a plurality of redirector-logical item pairs;
    b) determining a network delay between each of a plurality of clients and the plurality of servers;
    c) determining a server delay incurred in processing a client request at each of the plurality of servers;
    d) using the determined access rates of requests in step a), the network delays determined in step b) and the server delays determined in step c) as inputs, solving a non-linear program optimization problem to determine a set of weights associated with each of the plurality of redirector-logical item pairs so as to minimize the average delay associated with the client requests; and
    e) probabilistically forwarding a client request through the at least one redirector to a server that can satisfy that request using the determined weights associated with the redirector-logical pair item.

2. The method of claim 1 wherein the step d) comprises the step of formulating and solving a minimum cost network flow problem.

3. The method of claim 2 further comprising the step of first determining an initial distribution that maps logical items onto the servers.

4. The method of claim 2 wherein the logical items are a plurality of hot sites.

5. The method of claim 4 wherein the servers are caching servers that each replicate at least one of the hot sites.

6. The method of claim 2 wherein the logical items are groups of clients.

7. The method of claim 6 wherein the groups of clients are determined by their IP addresses.

8. The method of claim 7 wherein the servers are web servers.

9. The method of claim 7 wherein the servers are caching servers.

10. The method of claim 2 wherein the logical items are groups of documents.

11. The method of claim 10 wherein the groups of documents are determined by their origin server IP addresses.

12. The method of claim 10 wherein the at least one redirector is a content-smart switch and the groups of documents are determined by their URLs.

13. The method of claim 11 wherein the servers are web servers.

14. The method of claim 11 wherein the servers are caching servers.

15. The method of claim 2 wherein the at least one redirector is a virtual server for a plurality of web servers.

16. The method of claim 2 wherein steps a) through d) are periodically repeated to determine a new set of weights associated with each redirector-logical item pair to thereafter be used by the at least one redirector.

17. The method of claim 2 wherein steps a) through d) are repeated when a change of an access rate of requests at a redirector is detected.

18. The method of claim 2 wherein steps a) through d) are repeated when a server failure is detected.

19. The method of claim 2 wherein steps a) through d) are repeated when a change in network delay is detected.

20. The method of claim 2 wherein steps a) through d) are repeated when a change in the delay at a server is detected.

21. The method of claim 2 wherein a central management station (CMS) connected on the communications network collects the determined access rates of requests in step a) and the network delay in step b) from the at least one redirector, and the server delay in step c) from the plurality of servers, and then performs step d), the method then further comprising the step of forwarding the determined weights to the at least one redirector.

22. In a system which processes client requests through at least one redirector to a plurality of servers connected on a communications network, at least some of the client requests being capable of being satisfied by more than one of the servers, apparatus for minimizing an average delay associated with the client requests, the apparatus comprising:
   means for determining an access rate of requests associated with each of a plurality of redirector-logical item pairs;
   means for determining a network delay between each of a plurality of clients and the plurality of servers;
   means for determining a server delay incurred in processing a client request at each of the plurality of servers;
   means for solving a non-linear programming optimization problem to determine a set of weights associated with each of the plurality of redirector-logical items pairs so as to minimize the average delay of client requests using the determined access rate of requests, the determined network delays, and the determined server delays as inputs to the problem; and
   means for probabilistically forwarding a client request through the at least one redirector to a server in the system that can satisfy that request using the determined weights associated with the redirector-logical pair item.

23. The apparatus of claim 22 wherein the means for solving a non-linear optimization problem comprises means for formulating and solving a minimum cost network flow problem.

24. The apparatus of claim 23 further comprising means for determining an initial distribution that maps logical items onto the servers.

25. The apparatus of claim 23 wherein the logical items are a plurality of hot sites.

26. The apparatus of claim 25 wherein the servers are caching servers that each replicate at least one of the hot sites.

27. The apparatus of claim 23 wherein the logical items are groups of clients.

28. The apparatus of claim 27 wherein the groups of clients are determined by their IP addresses.

29. The apparatus of claim 28 wherein the servers are web servers.

30. The apparatus of claim 28 wherein the servers are caching servers.

31. The apparatus of claim 23 wherein the logical items are groups of documents.

32. The apparatus of claim 31 wherein the groups of documents are determined by their origin server IP addresses.

33. The apparatus of claim 31 wherein the at least one redirector is a content-smart switch and the groups of documents are determined by their URLs.

34. The apparatus of claim 32 wherein the servers are web servers.

35. The apparatus of claim 32 wherein the servers are caching servers.

36. The apparatus of claim 23 wherein the at least one redirector is a virtual server for a plurality of web servers.

37. The apparatus of claim 23 wherein the means for solving the non-linear optimization problem periodically determines a new set of weights associated with each redirector-logical item pair to thereafter be used by the at least one redirector.

38. The apparatus of claim 23 wherein the means for solving the non-linear optimization problem determines a new set of weights when a change of an access rate at a redirector is detected.

39. The apparatus of claim 23 wherein the means for solving the non-linear optimization problem determines a new set of weights when a server failure is detected.

40. The apparatus of claim 23 wherein the means for solving the non-linear optimization problem determines a new set of weights when a change in network delay is detected.

41. The apparatus of claim 23 wherein the means for solving the non-linear optimization problem determines a new set of weights when a change in the delay at a server is detected.

42. The apparatus of claim 23 further comprising means for forwarding the determined weights to the at least one redirector.

43. In a system which processes client requests through at least one redirector to a plurality of servers connected on a communications network, at least some of the client requests being capable of being satisfied by more than one of the servers, a method of determining a set of weights with which the at least one redirector will probabilistically forward client requests to the server in the system that can satisfy the requests comprising the steps of:
   a) determining an access rate of requests associated with each of a plurality of redirector-logical item pairs;
   b) determining a network delay between each of a plurality of clients and the plurality of servers;
   c) determining a server delay incurred in processing a client request at each of the plurality of servers; and
   d) using the determined access rates of requests in step a), the network delays determined in step b) and the server delays determined in step c) as inputs, solving a non-linear program optimization problem to determine the set of weights associated with each of the plurality of redirector-logical item pairs so as to minimize the average delay associated with the client requests.

44. The method of claim 43 wherein the step d) comprises the step of formulating and solving a minimum cost network flow problem.

45. The method of claim 44 further comprising the step of first determining an initial distribution that maps logical items onto the servers.

46. The method of claim 44 wherein the logical items are a plurality of hot sites.

47. The method of claim 46 wherein the servers are caching servers that each replicate at least one of the hot sites.

48. The method of claim 44 wherein the logical items are groups of clients.

49. The method of claim 48 wherein the groups of clients are determined by their IP addresses.

50. The method of claim 49 wherein the servers are web servers.

51. The method of claim 49 wherein the servers are caching servers.

52. The method of claim 44 wherein the logical items are groups of documents.

53. The method of claim 52 wherein the groups of documents are determined by their origin server IP addresses.

54. The method of claim 52 wherein the at least one redirector is a content-smart switch and the groups of documents are determined by their URLs.

55. The method of claim 53 wherein the servers are web servers.

56. The method of claim 53 wherein the servers are caching servers.

57. The method of claim 44 wherein the at least one redirector is a virtual server for a plurality of web servers.

58. The method of claim 44 wherein steps a) through d) are periodically repeated to determine a new set of weights associated with each redirector-logical item pair to thereafter be used by the at least one redirector.

59. The method of claim 44 wherein steps a) through d) are repeated when a change of an access rate of requests at a redirector is detected.

60. The method of claim 44 wherein steps a) through d) are repeated when a server failure is detected.

61. The method of claim 44 wherein steps a) through d) are repeated when a change in network delay is detected.

62. The method of claim 44 wherein steps a) through d) are repeated when a change in the delay at a server is detected.

63. The method of claim 44 wherein a central management station (CMS) connected on the communications network collects the determined access rates of requests in step a) and the network delay in step b) from the at least one redirector, and the server delay in step c) from the plurality of servers, and then performs step d), the method then further comprising the step of forwarding the determined weights to the at least one redirector.

64. A system for processing client requests to a plurality of servers connected on a communications network, at least some of the client requests being capable of being satisfied by more than one of the servers, the system comprising:

a least one redirector; and
   at least one processor performing the steps of:
   a) determining an access rate of requests associated with each of a plurality of redirector-logical item pairs;
   b) determining a network delay between each of a plurality of clients and the plurality of servers;
   c) determining a server delay incurred in processing a client request at each of the plurality of servers; and
   d) using the determined access rates of requests in step a), the network delays determined in step b) and the server delays determined in step c) as inputs, solving a non-linear program optimization problem to determine a set of weights associated with each of the plurality of redirector-logical item pairs so as to minimize the average delay associated with the client requests;
   the at least one redirector using the determined weights associated with each redirector-logical item pair to probabilistically forward each client request to a server that can satisfy that request.

65. The system of claim 64 wherein the at least one processor performs step d) by formulating and solving a minimum cost network flow problem.

66. The system of claim 65 wherein the at least one processor first performs a step of determining an initial distribution that maps logical items onto the servers.

67. The system of claim 65 wherein the logical items are a plurality of hot sites.

68. The system of claim 67 wherein the servers are caching servers that each replicate at least one of the hot sites.

69. The system of claim 65 wherein the logical items are groups of clients.

70. The system of claim 69 wherein the groups of clients are determined by their IP addresses.

71. The system of claim 70 wherein the servers are web servers.

72. The system of claim 70 wherein the servers are caching servers.

73. The system of claim 65 wherein the logical items are groups of documents.

74. The system of claim 73 wherein the groups of documents are determined by their origin server IP addresses.

75. The apparatus of claim 73 wherein the at least one redirector is a content-smart switch and the groups of documents are determined by their URLs.

76. The system of claim 74 wherein the servers are web servers.

77. The system of claim 74 wherein the servers are caching servers.

78. The system of claim 65 wherein the at least one redirector is a virtual server for a plurality of web servers.

79. The system of claim 65 wherein the at least one processor performs steps a) through d) periodically to determine a new set of weights associated with each redirector-logical item pair to be thereafter used by the at least one redirector.

80. The system of claim 65 wherein the at least one processor repeats steps a) through d) when a change of an access rate of requests at a redirector is detected.

81. The system of claim 65 wherein the at least one processor repeats steps a) through d) when a server failure is detected.

82. The system of claim 65 wherein the at least one processor repeats steps a) thought d) when a change in network delay is detected.

83. The system of claim 65 wherein the at least one processor repeats steps a) through d) when a change in the delay at a server is detected.

* * * * *